No. 801,954.  
A. WOOD.  
RATCHET WRENCH.  
APPLICATION FILED DEC. 27, 1904.  
PATENTED OCT. 17, 1905.

Witnesses:  
Elmer R. Shipley.  
M. S. Belden.

Augustus Wood  
Inventor  
by James W. See  
Attorney

UNITED STATES PATENT OFFICE.

AUGUSTUS WOOD, OF PHILADELPHIA, PENNSYLVANIA, ASSIGNOR TO NILES-BEMENT-POND COMPANY, OF JERSEY CITY, NEW JERSEY.

RATCHET-WRENCH.

No. 801,954.  Specification of Letters Patent.  Patented Oct. 17, 1905.

Application filed December 27, 1904. Serial No. 238,280.

*To all whom it may concern:*

Be it known that I, AUGUSTUS WOOD, a citizen of the United States, residing at Philadelphia, Philadelphia county, Pennsylvania, (whose post-office address is care Bement Miles & Company, Philadelphia, Pennsylvania,) have invented certain new and useful Improvements in Ratchet-Wrenches, of which the following is a specification.

This invention, pertaining to improvements in ratchet-wrenches and having for its object efficiency, simplicity, substantiability, and economy of production in such structures, will be readily understood from the following description, taken in connection with the accompanying drawings, in which—

Figure 1:
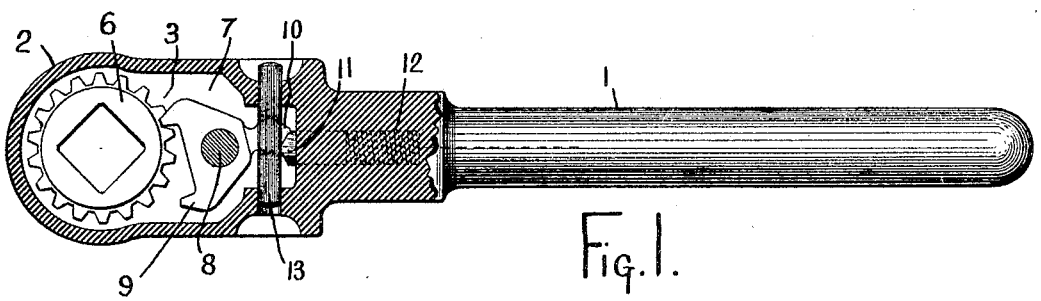
Figure 2:
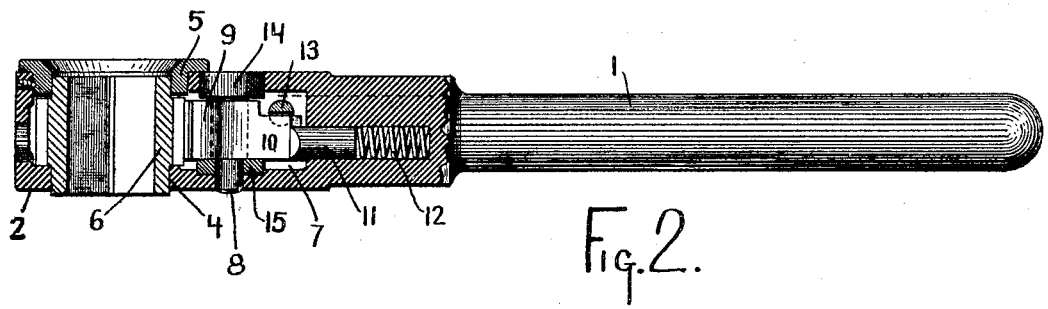

Figure 1 is a plan, part horizontal section, of a ratchet-wrench exemplifying my improved construction; and Fig. 2, a side elevation, part vertical section, of the same.

In the drawings, 1 indicates the lever of the wrench; 2, the head attached to or formed integral with the lever and adapted to carry the ratchet mechanism; 3, a chamber formed within the head; 4, a circular bearing formed in the lower wall of the chamber; 5, a flanged collar separably secured in a circular opening in the upper wall of the chamber, this collar having a bore concentric with the bearing 4; 6, the ratchet, having its hub journaled in the bearing 4 and in the collar 5, the body of the ratchet having double-faced teeth adapted to be driven in either direction by a pawl, the body of the ratchet being greater in diameter than its hub-journals, so that the ratchet becomes thus provided with shoulders to prevent its endwise displacement from the chamber, the ratchet being provided with a non-circular central opening adapted for the tool or other article with which the ratchet is to be employed; 7, that portion of the general chamber 3 extending from the ratchet toward the lever and having both its upper and lower walls formed by the material of the wrench-head; 8, a pawl-pin disposed across the portion 7 of the chamber with its axis parallel with that of the ratchet, this pin having its ends supported in suitable bearings in the upper and lower walls of the chamber portion across which it is disposed; 9, a double-ended pawl mounted on the pin and adapted to have either of its ends coöperate with the teeth of the ratchet; 10, a tail projecting from the pawl and having angular faces; 11, a plunger sliding freely to and from the pawl in a hole in the solid portion of the wrench-head, the inner end of this plunger having angular faces to coöperate with the angular faces of the tail of the pawl in an obvious manner; 12, a spring disposed behind the plunger and urging the plunger toward the pawl; 13, a pin disposed across the portion 7 of the chamber in the wrench-head above the tail of the pawl and sliding freely in the side walls of the chamber, the central portion of this pin being notched over the tail of the pawl and the pin being of such length as to project its ends in such manner that the operator's finger may employ it in tipping the pawl from one to the other side of the neutral; 14, a head formed on the upper end of the pawl-pin and engaging the upper wall of the chamber portion containing the pawl, this head projecting under the flange of collar 5, and 15 a hub or collar on the pawl-pin below the pawl and engaging the lower wall of the chamber portion containing the pawl.

In the construction of this device it is manifest that very little machining of parts is required, as the general interior of the chamber may be left as cast if the structure be made, for instance, of steel or malleable casting, and the exterior requires no machining except as a matter of good looks.

In assembling the parts the spring is first placed, then the plunger, then the adjusting-pin 13, then the washer 15, then the pawl, then the pawl-pin 14, then the ratchet, then the collar 5, and then the retaining-screws for the collar. Washer 15 as a part separable from the wall of the chamber is not essential. It is preferable that the pawl turn on the pawl-pin rather than that the pawl-pin turn in the wrench-head; but this is not of special importance.

It will be noticed that as the parts are successively put in place each serves to retain the last in position, so that the pawl-pin 8 serves to retain in place the parts 12, 11, 13, 10, and 9, and the bushing or collar 5 when secured in place in turn retains the pin 8 by engaging its head 14. Thus to assemble this entire device but one locking part need be employed—the screw or the like for retaining the bushing or collar 5 in place. The advantage of this construction in assembling and disassembling the wrench is obvious.

In Fig. 1 the parts are in the position suited for the turning of the ratchet in non-clockwise direction. To change the direction of action, it is only necessary to push on adjusting-pin 13 to tip the pawl out of action and past the neutral, whereupon the spring-plunger will urge the new end of the pawl to the ratchet.

It is to be observed that the bearings for adjusting-pin 13 are externally countersunk, so as to give the operator's finger access to the ends of the pin without having the pin project outwardly beyond the wrench-head, the result being that the ends of the pin are well protected from accidental displacement or injury.

I claim as my invention—

1. In a ratchet-wrench, the combination, substantially as set forth, of a wrench-head, a lever extension thereof, a ratchet journaled in the wrench-head, a double-ended pawl pivoted in the wrench-head and having an angularly-faced tail, a spring-plunger carried by the wrench-head and coöperating with the tail of the pawl, and an adjusting-pin engaging the pawl and sliding in the wrench-head in a direction at right angles to the axis of the pawl.

2. In a ratchet-wrench, the combination, substantially as set forth, of a wrench-head, a lever extension thereof, a ratchet journaled in the wrench-head, a double-ended pawl pivoted in the wrench-head and having an angularly-faced tail, a spring-plunger carried by the wrench-head and coöperating with the tail of the pawl, and an adjusting-pin sliding in the wrench-head in a direction at right angles to the axis of the pawl and having a notch engaging the tail of the pawl.

3. The combination of a head having a lever extension, a recess in the head, a spring in said recess, a plunger in said recess outwardly impelled by said spring and retaining the same in position, an adjusting-pin, a double pawl having a member engaging said plunger and retaining it in position, also engaging said adjusting-pin and retaining it in position, a ratchet engaged by said pawl, a pivot for said pawl, and a locking member retaining said pivot in position.

4. The combination of a head having a lever extension, a recess in the head, a spring in said recess, a plunger in said recess outwardly impelled by said spring and retaining the same in position, an adjusting-pin, a double pawl having a member engaging said plunger and retaining it in position, also engaging said adjusting-pin and retaining it in position, a ratchet engaged by said pawl, a pivot for said pawl, and a locking member retaining said ratchet in position.

5. The combination of a head having a lever extension, a recess in the head, a spring in said recess, a plunger in said recess outwardly impelled by said spring and retaining the same in position, an adjusting-pin, a double pawl having a member engaging said plunger and retaining it in position, also engaging said adjusting-pin and retaining it in position, a ratchet engaged by said pawl, a pivot for said pawl, and a locking member retaining said ratchet and said pivot in position.

AUGUSTUS WOOD.

Witnesses:
E. H. WRAY,
A. M. O'BRIEN.